US012639911B2

(12) United States Patent
Yamazaki et al.

(10) Patent No.: US 12,639,911 B2
(45) Date of Patent: May 26, 2026

(54) IMAGE PROCESSING APPARATUS AND IMAGE PROCESSING METHOD FOR POINT-OF-SALE SYSTEMS

(71) Applicant: Toshiba Tec Kabushiki Kaisha, Tokyo (JP)

(72) Inventors: Keita Yamazaki, Mishima Shizuoka (JP); Yuishi Takeno, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 322 days.

(21) Appl. No.: 18/466,652

(22) Filed: Sep. 13, 2023

(65) Prior Publication Data

US 2024/0144639 A1 May 2, 2024

(30) Foreign Application Priority Data

Nov. 2, 2022 (JP) ................................. 2022-176434

(51) Int. Cl.
*G06V 10/44* (2022.01)
*G06Q 20/20* (2012.01)

(52) U.S. Cl.
CPC ........... *G06V 10/457* (2022.01); *G06Q 20/20* (2013.01)

(58) Field of Classification Search
USPC ......................................................... 382/201
See application file for complete search history.

(56) References Cited

U.S. PATENT DOCUMENTS

| | | | |
|---|---|---|---|
| 2015/0310601 A1* | 10/2015 | Rodriguez ........... | G06Q 20/208 |
| | | | 348/150 |
| 2020/0279124 A1* | 9/2020 | Huang ................. | G06V 40/103 |
| 2022/0300751 A1* | 9/2022 | Akiyama ............... | G06V 10/40 |

FOREIGN PATENT DOCUMENTS

| | | | | |
|---|---|---|---|---|
| CN | 110345955 A | * 10/2019 | ........ | B60W 60/0015 |

OTHER PUBLICATIONS

Zhe Cao, "OpenPose: Realtime Multi-Person 2D Pose Estimation using Part Affinity Fields", IEEE Transactions on Pattern Analysis and Machine Intelligence, May 30, 2019, 14 pages.
Takami Ryousei et al., "Detection of chromosomes using bottoms-up graph partitioning", Research Report of the Information Processing Society of Japan, IPSJ SIG Technical Report, vol. 2020-CVIM-222 No. 20, 39 pages.
Japanese Office Action dated Oct. 14, 2025, mailed in counterpart Japanese Application No. 2022-176434, 6 pages.

* cited by examiner

*Primary Examiner* — Jacky X Zheng
(74) *Attorney, Agent, or Firm* — Kim & Stewart LLP

(57) ABSTRACT

According to one embodiment, an image processing apparatus includes a camera interface for connecting to a camera, a communication interface for connecting to an external device, and a processing unit. The processing unit is configured to acquire an image from the camera via the camera interface, identify at least two different types of key points of an object depicted in the image, calculate evaluation values of respective combinations in which the different types of key points are connected to one another, and then select at least two patterns of combinations with other key points in descending order of the evaluation values for each of the key points. The processing unit recognizes the object depicted in the image by connecting combinations of at least (Continued)

two patterns selected for each of the key points with other
key points.

14 Claims, 7 Drawing Sheets

Figure 3:
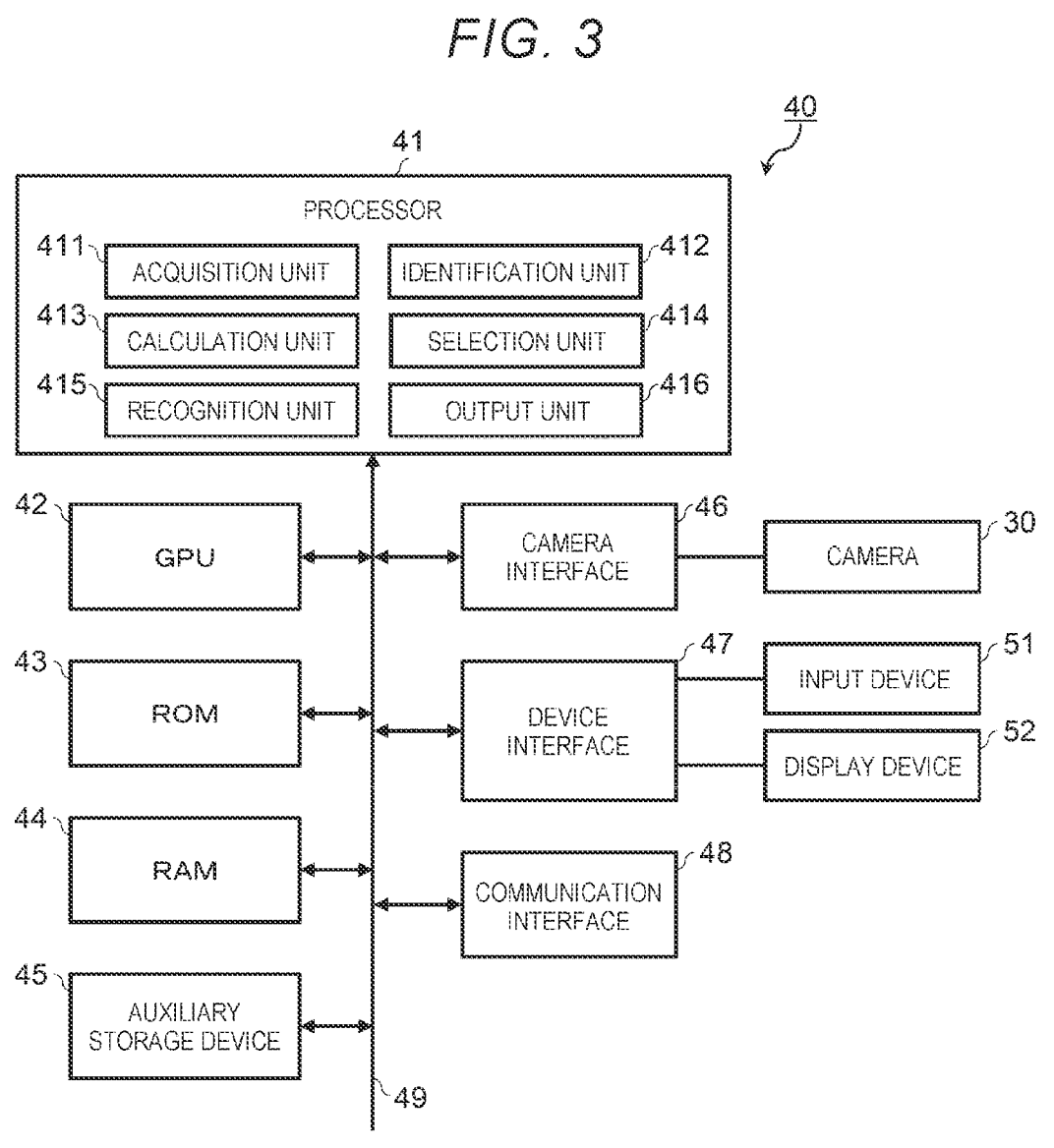

PROCESSOR

411 — ACQUISITION UNIT

412 — IDENTIFICATION UNIT

413 — CALCULATION UNIT

414 — SELECTION UNIT

415 — RECOGNITION UNIT

416 — OUTPUT UNIT

42 — GPU

46 — CAMERA INTERFACE

30 — CAMERA

43 — ROM

47 — DEVICE INTERFACE

51 — INPUT DEVICE

52 — DISPLAY DEVICE

44 — RAM

48 — COMMUNICATION INTERFACE

45 — AUXILIARY STORAGE DEVICE

49

IMAGE PROCESSING APPARATUS AND IMAGE PROCESSING METHOD FOR POINT-OF-SALE SYSTEMS

CROSS-REFERENCE TO RELATED APPLICATION

This application is based upon and claims the benefit of priority from Japanese Patent Application No. 2022-176434, filed Nov. 2, 2022, the entire contents of which are incorporated herein by reference.

FIELD

Embodiments described herein relate generally to an image processing apparatus and an image processing method.

BACKGROUND

In recent years, a technique of estimating a posture of a person depicted in a camera image by processing the image using a deep learning method has been disclosed. For example, "OpenPose" is a technique for estimating the posture of a person by the following first to third acts. In the first act, coordinates of features, i.e., key points, such as a head, a neck, shoulders, elbows, wrists, hands, waist, knees, and ankles of the person in the image are estimated. In the second act, the head is connected to the neck, the neck is connected to the shoulders, and the shoulders are connected to the elbows, so that direction vectors each representing a connection between the key points are calculated based on relevance of the key points. In the third act, the posture of the person is estimated by combining the key points and the direction vectors between the key points.

By using such a technique, a posture of a person can be estimated even when two or more persons are depicted in an image. However, in the technique of the related art, only one type of direction vector from one key point to another key point is calculated even though there may be a plurality of other relevant key points. For example, it is assumed that since a person A and a person B are shaking hands, a wrist and a hand of the person A and a wrist of the person B are depicted in the image, but a hand of the person B may be hidden by the hand of the person A and is not actually depicted in the image. In this case, in the first act, coordinates of the wrist and the hand of the person A and the wrist of the person B are estimated as the key points. In the second act, since there is a known relationship between the wrist and the hand, a direction vector between the wrist of the person A and the hand of the person A is calculated. However, in this case, since the hand of the person A has already matched with another relevant key point, that is, the wrist, the hand of the person A is not combined with any other relevant key point of the same type as the already matched key point, that is, the wrist of the person B. As a result, the posture of the person B cannot be estimated from the wrist forward.

BRIEF DESCRIPTION OF THE DRAWINGS

FIG. 1 is a schematic diagram of a self-service POS terminal according to an embodiment.
FIG. 3 is a block diagram of an image processing apparatus.

DETAILED DESCRIPTION

Figure 2:
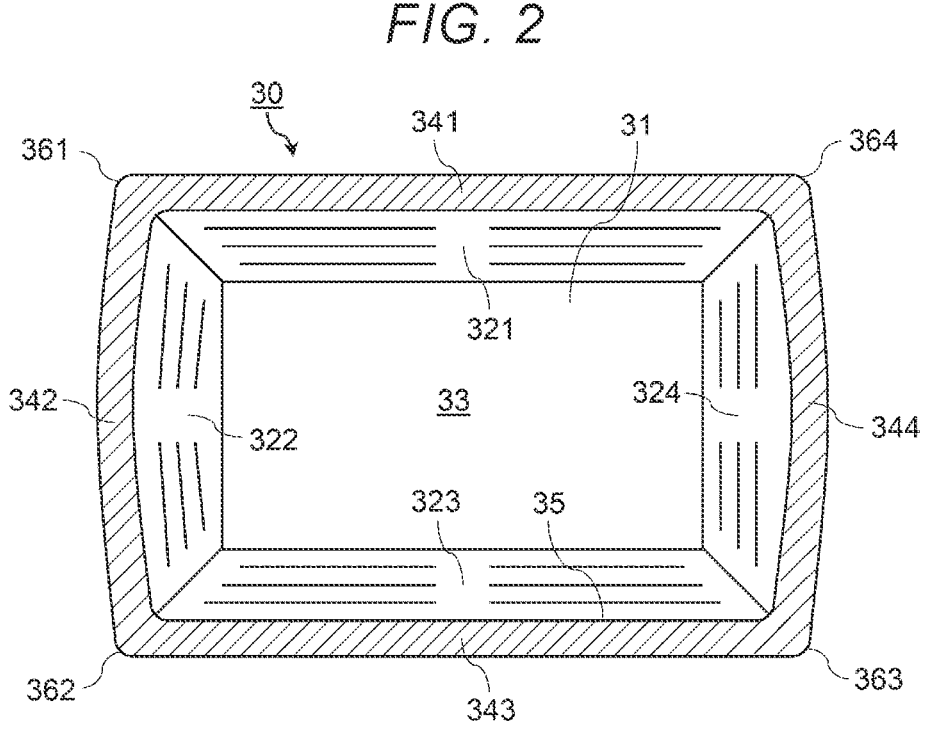
FIG. 2 is a top view of a shopping basket.

In general, according to one embodiment, an image processing apparatus, and an image processing method capable of assigning a plurality of connection relationships from one key point to another key point are provided.

In general, according to one embodiment, an image processing apparatus includes a camera interface for connecting to a camera, a communication interface for connecting to an external device, and a processing unit. The processing unit is configured to acquire an image from the camera via the camera interface, identify at least two different types of key points of an object depicted in the image, calculate evaluation values of respective combinations in which the different types of key points are connected to one another, and then select at least two patterns of combinations with other key points in descending order of the evaluation values for each of the key points. The processing unit recognizes the object depicted in the image by connecting combinations of at least two patterns selected for each of the key points with other key points.

Hereinafter, an embodiment of an image processing apparatus capable of assigning a plurality of connection relationships from one key point to another relevant key point will be described with reference to the drawings.

In the present embodiment, an image processing apparatus is exemplified in which a plurality of connection relationships from one key point to another key point can be assigned by applying a technique of "OpenPose", so that an opening of a shopping basket placed on a basket receiving table of a self-service POS terminal can be detected based on an image captured by a camera provided in the vicinity of the self-service POS terminal. First, an outline of a self-service POS terminal 10 will be described with reference to FIG. 1.

Figure 1:
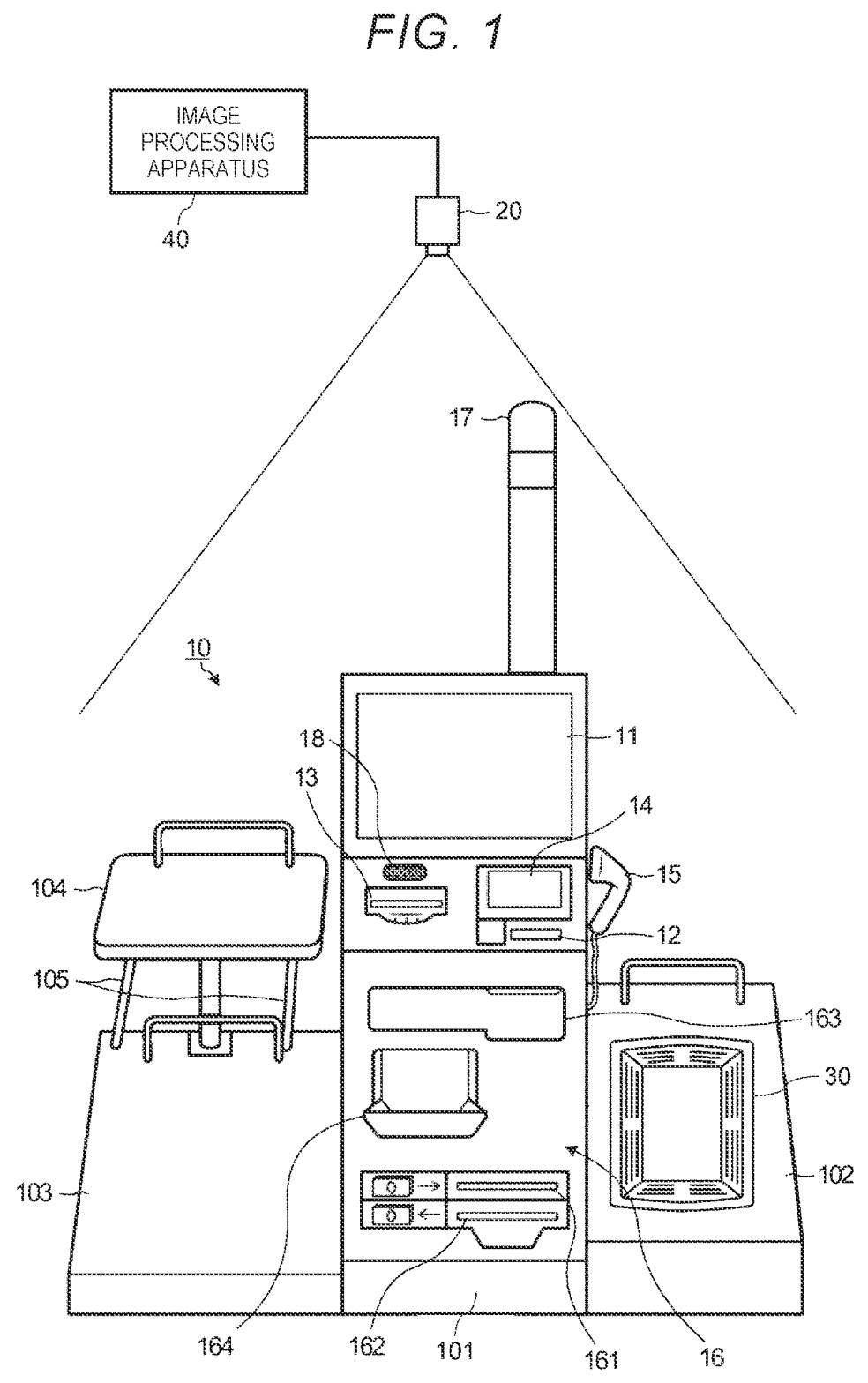

FIG. 1 is a schematic diagram showing an external configuration of the self-service POS terminal 10. The self-service POS terminal 10 includes a main body 101, and a basket receiving table 102 and a bagging table 103 disposed on left and right sides of the main body 101. The basket receiving table 102 disposed on the right side of the main body 101 is a table for a customer who performs settlement to place a shopping basket 30 accommodating commodities to be purchased. The bagging table 103 disposed on the left side of the main body 101 is a table for the customer to bag the registered commodities. The customer puts the commodities in a plastic bag or a customer's own bag on the bagging table 103.

In FIG. 1, a temporary placing table 104 is provided on an upper portion of the bagging table 103 via a support column. The temporary placing table 104 is, for example, a table for temporarily placing commodities before the commodities are put in a plastic bag, or the like. The temporary placing table 104 is provided with two holding arms 105 spaced apart from each other to the left and right. The customer can use these holding arms 105 to hold a plastic bag, a customer's own bag (reusable bag), or the like on the bagging table 103 in an open state. The arrangement positions of the basket receiving table 102 and the bagging table 103 on the left and right sides may be reversed in other examples.

The main body 101 includes a touch panel 11, a card reader 12, a printer 13, a scanner 14, a hand scanner 15, a cash processing machine 16, a pilot lamp 17, a speaker 18, and the like.

The touch panel 11 is a display device capable of displaying display elements including characters, symbols, images, and the like on a display. The touch panel 11 is also an input device that detects a touch operation on the display by a sensor, and processes a display element at the touch operation position as an input. At the self-service POS terminal 10, various images for supporting an operation of the customer are displayed on the touch panel 11.

The card reader 12 is an input device that reads data recorded in a card medium such as a credit card, an electronic money card, or a point card (e.g., customer loyalty program card). When the card medium is a magnetic card, the card reader 12 is a magnetic card reader. When the card medium is an IC card, the card reader 12 is an IC card reader. The self-service POS terminal 10 may include either the magnetic card reader or the IC card reader, or include both as the card reader 12. The card reader 12 may be a card reader-writer having a function of writing data to a card.

The printer 13 is an output device that prints data related to a purchase receipt, a credit card slip, and the like on a receipt sheet. The printed receipt sheet is cut by a cutter and dispensed from a receipt dispensing port. The printer 13 is implemented as, for example, a thermal printer or a dot impact printer.

The scanner 14 and the hand scanner 15 are input devices that read machine-readable codes such as bar codes or two-dimensional codes. The scanner 14 optically reads a machine-readable code held over a reading window (glass window). The hand scanner 15 is operated while being held by a customer's hand. The hand scanner 15 optically reads the machine-readable code by being brought close to the machine-readable code.

The cash processing machine 16 is a device that processes cash payments and dispenses change as necessary. The cash processing machine 16 includes a bill insertion port 161, a bill discharge port 162, a coin insertion port 163, and a coin discharge port 164. The cash processing machine 16 processes bills inserted into the bill insertion port 161. The cash processing machine 16 discharges bills as change from the bill discharge port 162. The cash processing machine 16 receives and processes coins inserted into the coin insertion port 163. The cash processing machine 16 discharges coins as change from the coin discharge port 164.

The pilot lamp 17 is used to signal an alert, a notification, or the like generated in the self-service POS terminal 10. The pilot lamp 17 is attached to a tip end of a pole extending in a vertical direction so as to be viewable from a distance. The pilot lamp 17 includes a light-emitting member and a cylinder. The light-emitting member is attached inside the cylinder so as to be rotatable coaxially with the cylinder. When the pilot lamp 17 is operated, the light-emitting member can be rotated while emitting light.

The speaker 18 is used to output (signal) an alert, notification, or the like generated in the self-service POS terminal 10 by voice or sound. For example, the speaker 18 generates a buzzer sound corresponding to a state of the alert. Alternatively, the speaker 18 generates a voice message corresponding to the state of the alert.

A camera 20 (an imaging device) is attached to an upper portion of the main body 101. The camera 20 is a monocular camera in this example. The camera 20 acquires images of the self-service POS terminal 10 and a person who operates the self-service POS terminal 10 to perform settlement.

As shown in FIG. 1, the display of the touch panel 11, a card insertion port of the card reader 12, the receipt dispensing port of the printer 13, the reading window of the scanner 14, and the bill insertion port 161, the bill discharge port 162, the coin insertion port 163, and the coin discharge port 164 of the cash processing machine 16 are disposed on one surface (hereinafter referred to as a front surface) of the main body 101. Therefore, the person who performs settlement stands to face the front surface of the main body 101. The camera 20 has a field of view that includes the self-service POS terminal 10 and the person who performs settlement in front of the self-service POS terminal 10 from above. Therefore, a head, a face, shoulders, arms, a chest, abdomen, and the like of the person who performs settlement are imaged by the camera 20.

An upper surface of the self-service POS terminal 10 including the basket receiving table 102 and the bagging table 103 are also imaged by the camera 20. Accordingly, when the shopping basket 30 is placed on the basket receiving table 102, an opening of the shopping basket 30 and the commodities accommodated inside the shopping basket 30 are imaged by the camera 20.

The camera 20 is connected to an image processing apparatus 40. The image processing apparatus 40 has a function of recognizing the shopping basket 30 placed on the basket receiving table 102 by processing a camera image from camera 20. Information about the shopping basket 30 recognized by the image processing apparatus 40 may be provided to a monitoring apparatus. The monitoring apparatus can be an apparatus for monitoring a motion of the person who performs settlement and stands in front of the self-service POS terminal 10.

Hereinafter, a function of recognizing the shopping basket 30 will be described.

First, an outline of the shopping basket 30 according to an embodiment will be described with reference to FIG. 2. The shopping baskets 30 are prepared by or for a store and are made available to customer to use within the store. Each of the shopping baskets 30 at the same store has the same shape. The shopping basket 30 is one example of a container that might be used in this context or in other applications.

FIG. 2 is a top down view of the shopping basket 30. In the shopping basket 30, four side walls 321, 322, 323, and 324 are extend upward from respective edges of a rectangular bottom wall 31 so as to be slightly inclined outward. four side walls 321, 322, 323, and 324 thus form an accommodating portion 33 having an upper opening. Upper end portions 341, 342, 343, and 344 of the respective side walls 321, 322, 323, and 324 are joined to the upper end portions 341, 342, 343, and 344 of the adjacent side walls 321, 322, 323, and 324, and a generally rectangular opening portion 35. That is, the opening portion 35 has four edges (the upper end portions 341, 342, 343, and 344) and four corners. The four corners include a first corner 361 which is a joint portion between the upper end portion 341 and the upper end portion 342, a second corner 362 which is a joint portion between the upper end portion 342 and the upper end portion 343, a third corner 363 which is a joint portion between the upper end portion 343 and the upper end portion 344, and a fourth corner 364 which is a joint portion between the upper end portion 344 and the upper end portion 341.

The image processing apparatus 40 in this example recognizes the shopping basket 30 placed on the basket receiving table 102 by recognizing contours of opening portion 35 of the shopping basket 30.

A pair of U-shaped handles are usually attached to the shopping basket 30, but in the present embodiment, the handles are not depicted for simplicity of explanation.

FIG. 3 is a block diagram of the image processing apparatus 40. As shown in FIG. 3, the image processing apparatus 40 includes a processor 41, a graphics processing unit (GPU) 42, a read only memory (ROM) 43, a random access memory (RAM) 44, an auxiliary storage device 45, a camera interface 46, a device interface 47, a communication interface 48, and a system transmission path 49. The system transmission path 49 can be or include an address bus, a data bus, a control signal line, and the like. The image processing apparatus 40 connects the processor 41, the GPU 42, the ROM 43, the RAM 44, the auxiliary storage device 45, the camera interface 46, the device interface 47, and the communication interface 48 by the system transmission path 49.

The processor 41 controls various units, sub-units, and the like to implement various functions of the image processing apparatus 40 in accordance with an operating system and/or an application program. The processor 41 is, for example, a central processing unit (CPU).

The GPU 42 is a calculation device that functions as an accelerator that assists a calculation process performed by the processor 41. In the image processing apparatus 40, the GPU 42 is mainly used to execute an image processing calculations at high speed.

The ROM 43 and the RAM 44 correspond to main storage units. The ROM 43, which is a nonvolatile memory region, stores an operating system or an application program. The ROM 43 may also store data necessary for the processor 41 to execute a process for controlling each unit. The RAM 44, which is a volatile memory region, is used as a work area in which data can be appropriately rewritten. The RAM 44 may store the application program or the data necessary for the processor 41 to execute the process for controlling each unit.

The auxiliary storage device 45 corresponds to an auxiliary storage unit. For example, an electric erasable programmable read-only memory (EEPROM), a hard disc drive (HDD), a solid-state drive (SSD), or the like may serve as the auxiliary storage device 45. The auxiliary storage device 45 stores data used when the processor 41 or the GPU 42 performs various processes, data generated by these processes, and the like. The auxiliary storage device 45 may store the application program described above.

The camera interface 46 is connected to the camera 20. The camera interface 46 takes in image data captured by the camera 20 as needed.

The device interface 47 connects to an input device 51 and a display device 52. The device interface 47 has a function of handling a data signal received from the input device 51 and a function of handling display data output to the display device 52. The input device 51 can be a keyboard, a pointing device, a touch panel, or the like. The display device 52 can be a display, a touch panel, or the like.

The communication interface 48 is a circuit for performing data communication with a monitoring apparatus or the like. The communication interface 48 can also perform the data communication with an external device other than a monitoring apparatus.

The image processing apparatus 40 recognizes the shopping basket 30 placed on the basket receiving table 102 in a camera image by machine learning using a deep neural network (DNN) used in, for example, "OpenPose". The processor 41 has functions as an acquisition unit 411, an identification unit 412, a calculation unit 413, a selection unit 414, a recognition unit 415, and an output unit 416.

The acquisition unit 411 has a function of acquiring an image in which an object to be recognized is included. In the present embodiment, the object to be recognized is the shopping basket 30 placed on the basket receiving table 102. That is, the acquisition unit 411 acquires an image in which the shopping basket 30 on the basket receiving table 102 is included from images captured by the camera 20 and taken-in via the camera interface 46.

Figure 6:
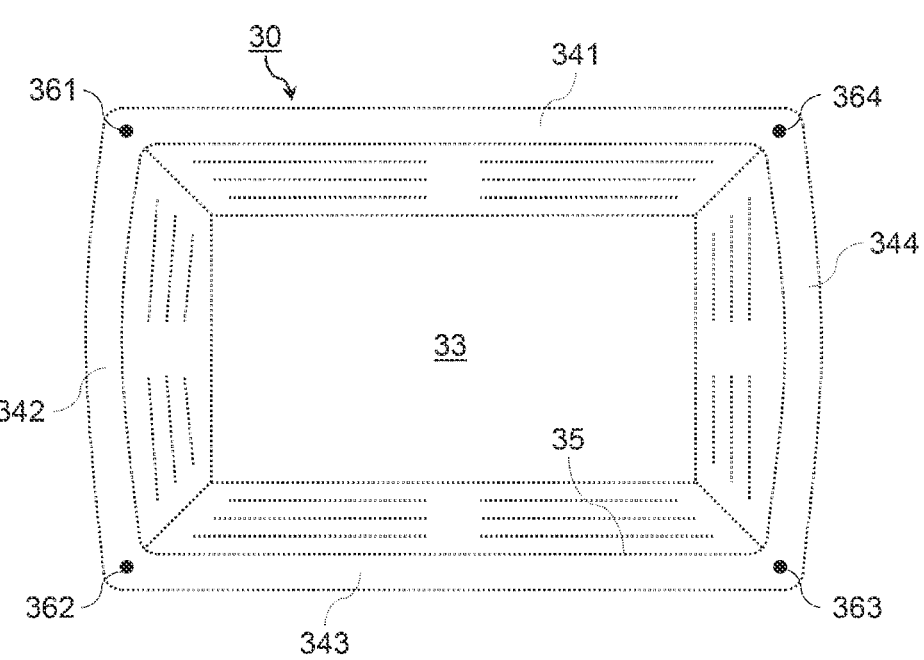
FIG. 6 is a schematic diagram illustrating corners of a shopping basket as a key point.
Figure 7:
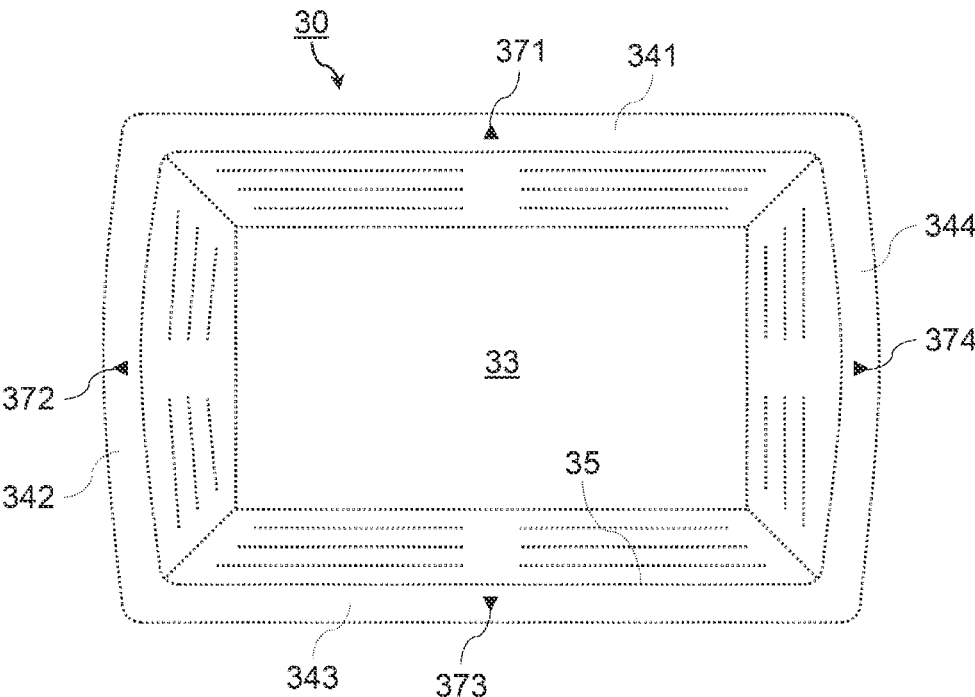
FIG. 7 is a schematic diagram illustrating midpoints of a shopping basket as another key point.

The identification unit 412 has a function of identifying two or more types of key points set for an object from an image acquired by the acquisition unit 411. In the present embodiment, the object to be recognized is a shopping basket 30, and the four corners 361, 362, 363, and 364 of the opening portion 35 of the shopping basket 30 as depicted in FIG. 6 and midpoints 371, 372, 373, and 374 of the four upper end portions 341, 342, 343, and 344 constituting the same opening portion 35 as depicted in FIG. 7 are defined as the key points. That is, the identification unit 412 identifies the four corners 361, 362, 363, and 364 and the four midpoints 371, 372, 373, and 374 of the shopping basket 30 in an image. That is, the identification unit 412 identifies a plurality of key points of at least two types (e.g., corners and midpoints in this example). Such an identification unit 412 can be implemented by a deep learning method in which the image acquired by the acquisition unit 411 is used as an image input to the DNN used in "OpenPose", and coordinates serving as a peak value (extreme point) of a heat map are used as a key point.

The calculation unit 413 has a function of calculating an evaluation value of each combination in which different types of key points are connected to one another. When the object to be recognized is the shopping basket 30, the calculation unit 413 calculates an evaluation value for each of 16 combinations in which the four corners 361, 362, 363, and 364 (which are first-type key points) and the four midpoints 371, 372, 373, and 374 (which are second-type key points) are connected. The combination between the key points is obtained by outputting a vector field (PAF: Part Affinity Field) of a two-dimensional unit vector in which pixels between different types of key points can be connected by a straight line by processing of the DNN used in the identification unit 412. The evaluation value is a value obtained by dividing an integrated value of PAF between the key points that is calculated by the heat map as a path length between the key points.

The selection unit 414 has a function of selecting two or more patterns of combinations with other key points in descending order of the evaluation values for each key point. For example, with respect to the first midpoint 371 of the upper end portion 341, there are four patterns respectively connecting four key points, that is, the first corner 361 connecting the upper end portion 341 and the upper end portion 342, the second corner 362 connecting the upper end portion 342 and the upper end portion 343, the third corner 363 connecting the upper end portion 343 and the upper end portion 344, and the fourth corner 364 connecting the upper end portion 344 and the upper end portion 341. This similarly applies to the second midpoint 372 of the upper end portion 342, the third midpoint 373 of the upper end portion 343, and the fourth midpoint 374 of the upper end portion 344. The selection unit 414 selects two or more patterns in descending order of the evaluation values from the four patterns. Such a selection unit 414 can be implemented by using a method of Hungarian notation (identifier naming convention) for solving an assignment problem between the key points in total.

The recognition unit 415 has a function of recognizing an object by connecting combinations of two or more patterns selected for each key point with other key points. When the object to be recognized is the shopping basket 30, and when the opening portion 35 is formed by connecting combinations of two or more patterns selected for each key point with other key points, the recognition unit 415 determines that the shopping basket 30 placed on the basket receiving table 102 is recognized.

The output unit 416 has a function of outputting a recognition result obtained by the recognition unit 415. The output unit 416 outputs the recognition result to the monitoring apparatus, for example. The output unit 416 may output the recognition result to a device other than the monitoring apparatus. Alternatively, the output unit 416 may display the recognition result on the display device 52.

As described above, the functions of the acquisition unit 411, the identification unit 412, the calculation unit 413, the selection unit 414, the recognition unit 415, and the output unit 416 are implemented by the processor 41 processing a camera image by a deep learning method according to an image processing program. The image processing program is one type of application program stored in the ROM 43 or the auxiliary storage device 45. A method of installing such an image processing program in the ROM 43 or the auxiliary storage device 45 is not particularly limited. The image processing program can be recorded on a removable recording medium, or distributed or accessed via a network, so that the image processing program can be installed in the ROM 43 or the auxiliary storage device 45. A format of the recording medium is not limited as long as the recording medium can store a program and can be read by a device, such as a CD-ROM or a memory card.

Figure 4:
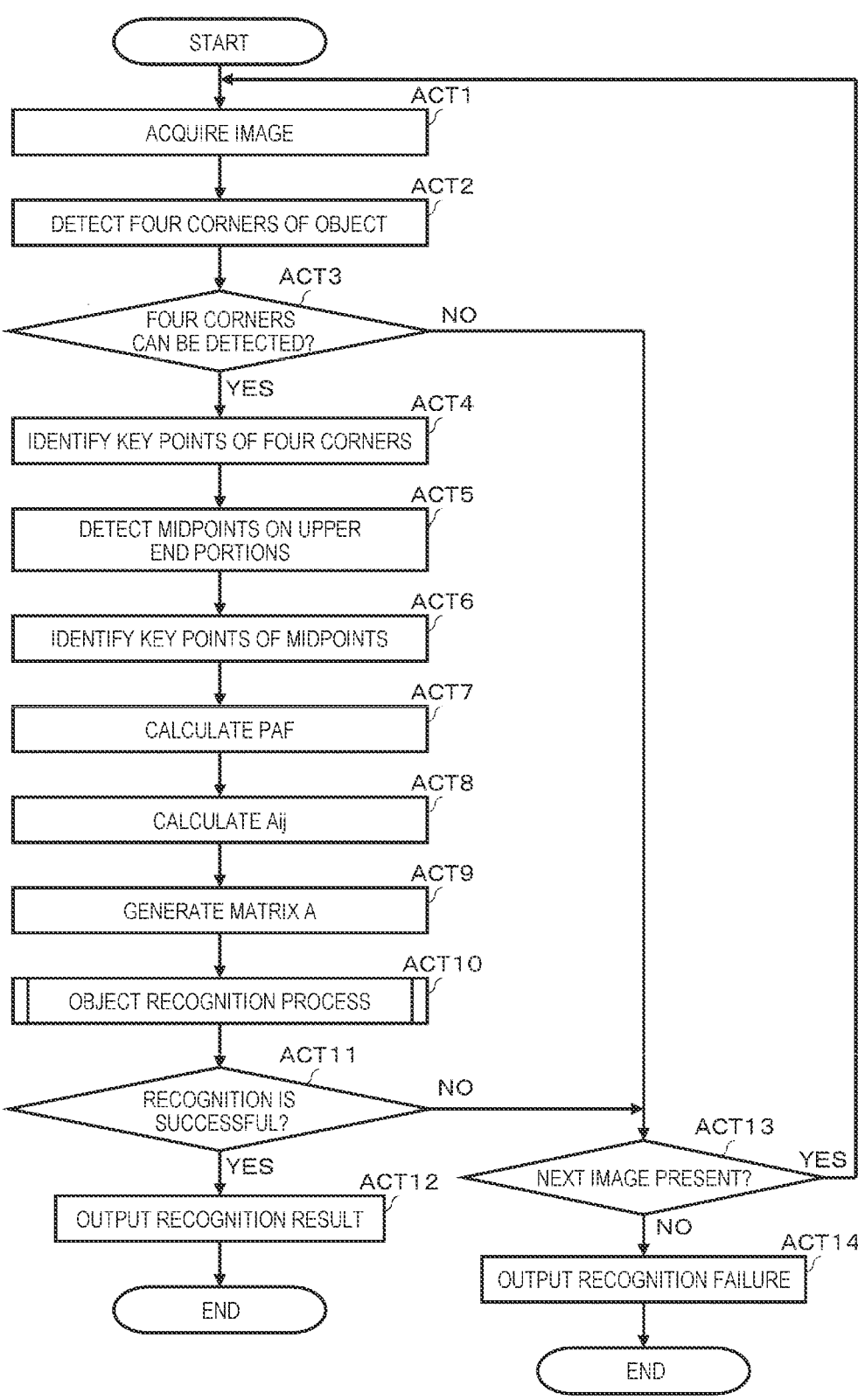
FIG. 4 is a flowchart of an information process executed by a processor according to an image processing program.
Figure 5:
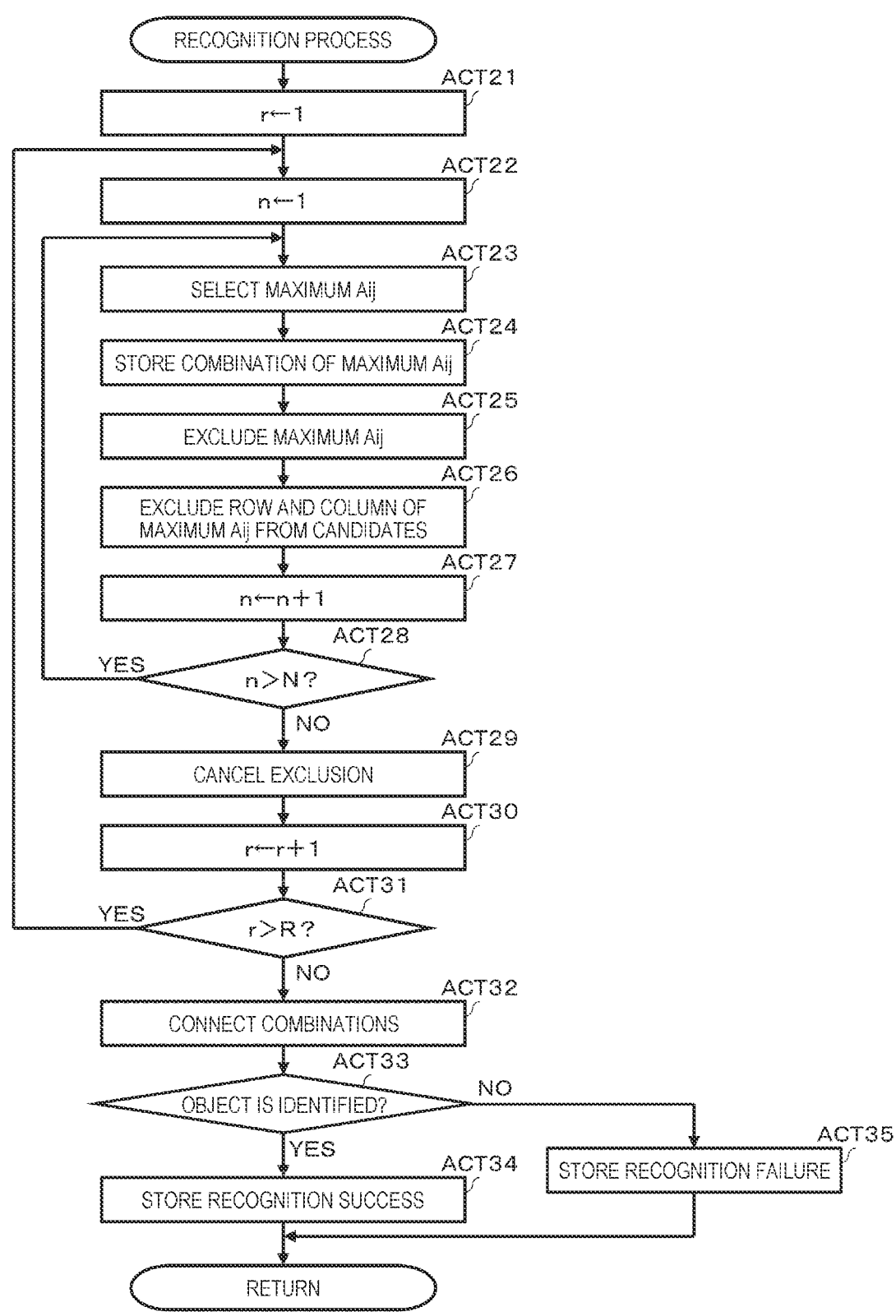
FIG. 5 is a flowchart of an object recognition process.

FIGS. 4 and 5 are flowcharts of an information processing executed by the processor 41 according to an image processing program. By the processor 41 executing this information processing, the image processing apparatus 40 can recognize when the shopping basket 30 is placed on the basket receiving table 102.

Hereinafter, operations of the image processing apparatus 40 will be described with reference to the flowcharts of FIGS. 4 and 5. The procedures and contents of the process described below are merely examples. If the same effect can be obtained, the procedures and contents of the process can be appropriately changed.

As ACT 1, the processor 41 first acquires the camera image via the camera interface 46. As ACT 2, once the camera image is acquired, the processor 41 detects four corners 361, 362, 363, and 364 of the opening portion 35 of the shopping basket 30 on the basket receiving table 102 from the camera image. For example, the processor 41 obtains a probability of the first corner 361, the second corner 362, the third corner 363, or the fourth corner 364 for each pixel in the camera image by using the GPU 42, and acquires a heat map indicating a distribution of the probabilities across the image.

As ACT 3, the processor 41 determines whether the heat map indicates the four corners 361, 362, 363, and 364 can be detected. When the four corners 361, 362, 363, and 364 of the shopping basket 30 cannot be detected, the processor 41 proceeds from ACT 3 to ACT 13.

As ACT 13, the processor 41 confirms whether a next (another) camera image has been taken in. When the next camera image has been taken in, the processor 41 returns from ACT 13 to ACT 1. The processor 41 executes the processing of ACT 1 and thereafter in the same manner as already described above. Accordingly, the processor 41 continues to acquire a camera image until a heat map indicating the four corners 361, 362, 363, and 364 of the shopping basket 30 on the basket receiving table 102 can be detected.

When a heat map indicating the four corners 361, 362, 363, and 364, the processor 41 proceeds from ACT 3 to ACT 4. As ACT 4, the processor 41 identifies the key points of the respective four corners 361, 362, 363, and 364. That is, the processor 41 identifies two-dimensional coordinates (Xa, Ya) of a pixel of the first corner 361 corresponding to the peak value of the heat map indicating the distribution of the probability as the key point of the first corner 361. Similarly, the processor 41 identifies two-dimensional coordinates (Xb, Yb) of a pixel of the second corner 362 corresponding to the peak value of the heat map indicating the distribution of the probability as the key point of the second corner 362. The processor 41 identifies two-dimensional coordinates (Xc, Yc) of a pixel of the third corner 363 corresponding to the peak value of the heat map indicating the distribution of the probability as the key point of the third corner 363. The processor 41 identifies two-dimensional coordinates (Xd, Yd) of a pixel of the fourth corner 364 corresponding to the peak value of the heat map indicating the distribution of the probability as the key point of the fourth corner 364.

Once the key points of the first to fourth corners 361, 362, 363, and 364 have been identified, the processor 41 proceeds to ACT 5. As ACT 5, the processor 41 detects the midpoints 371, 372, 373, and 374 on the four upper end portions 341, 342, 343, and 344 of the opening portion 35. For example, the processor 41 uses the GPU 42 to obtain probabilities of the midpoints 371, 372, 373, and 374 of the four upper end portions 341, 342, 343, and 344 for each pixel in the camera image, and acquires a heat map indicating a distribution of the probabilities. That is, the processor 41 detects, as the second midpoint 372, a pixel group including a peak value of the heat map indicating the distribution of the probabilities of being the midpoint of the upper end portion 342 connecting the first corner 361 and the second corner 362. Similarly, the processor 41 detects, as the third midpoint 373, a pixel group including a peak value of the heat map indicating the distribution of the probabilities of being the midpoint of the upper end portion 343 connecting the second corner 362 and the third corner 363. The processor 41 detects, as the fourth midpoint 374, a pixel group including a peak value of the heat map indicating the distribution of the probabilities of being the midpoint of the upper end portion 344 connecting the third corner 363 and the fourth corner 364. The processor 41 detects, as the first midpoint 371, a pixel group including a peak value of the heat map indicating the distribution of the probabilities of the midpoint of the upper end portion 341 connecting the fourth corner 364 and the first corner 361.

Once the midpoints 371, 372, 373, and 374 have been detected, the processor 41 proceeds to ACT 6. As ACT 6, the processor 41 identifies key points of the first to fourth midpoints 371, 372, 373, and 374. That is, the processor 41 identifies two-dimensional coordinates (Xe, Ye) of a pixel corresponding to the peak value of the heat map indicating the distribution of the probabilities of the first midpoint 371 as the key point of the first midpoint 371. Similarly, the processor 41 identifies two-dimensional coordinates (Xf, Yf) of a pixel corresponding to the peak value of the heat map indicating the distribution of the probabilities of the second midpoint 372 as the key point of the second midpoint 372. The processor 41 identifies two-dimensional coordinates (Xg, Yg) of a pixel corresponding to the peak value of the heat map indicating the distribution of the probabilities of being the third midpoint 373 as the key point of the third midpoint 373. The processor 41 identifies two-dimensional coordinates (Xh, Yh) of a pixel corresponding to the peak value of the heat map indicating the distribution of the probabilities of the fourth midpoint 374 as the key point of the fourth midpoint 374.

Once the key points of the first to fourth midpoints 371, 372, 373, and 374 have been identified, the processor 41 proceeds to ACT 7. As ACT 7, the processor 41 calculates the PAF, that is, the vector field of the two-dimensional unit vector in which pixels between different types of key points can be connected by a straight line. That is, the processor 41 calculates an X component and a Y component of a direction vector from the first midpoint 371 toward the first corner 361, an X component and a Y component of a direction vector from the first midpoint 371 toward the second corner 362, an X component and a Y component of a direction vector from the first midpoint 371 toward the third corner 363, and an X component and a Y component of a direction vector from the first midpoint 371 toward the fourth corner 364. Similarly, the processor 41 calculates an X component and a Y component of a direction vector from the second midpoint 372 toward the first corner 361, an X component and a Y component of a direction vector from the second midpoint 372 toward the second corner 362, an X component and a Y component of a direction vector from the second midpoint 372 toward the third corner 363, and an X component and a Y component of a direction vector from the second midpoint 372 toward the fourth corner 364. The same applies to the third midpoint 373 and the fourth midpoint 374.

After the calculation of the PAF is ended, the processor 41 proceeds to ACT 8. As ACT 8, the processor 41 calculates an evaluation value Aij. The evaluation value Aij is a value obtained by dividing an integrated value of the PAF between a key point of an i-th (1≤i≤4) corner 36i and a key point of a j-th (1≤j≤4) midpoint 37j by a path length between these two key points.

Figure 8:
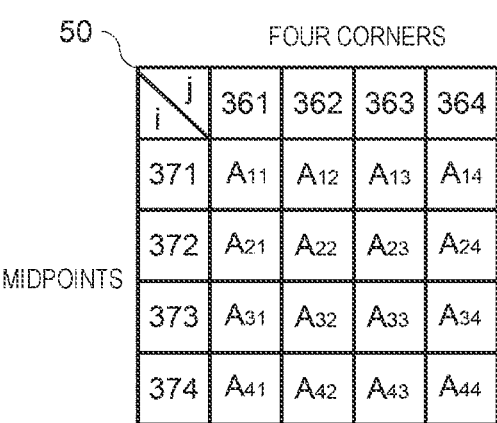
FIG. 8 is a schematic diagram showing an example of a matrix generated in an object recognition process.

Once the calculation of the evaluation values Aij is ended, the processor 41 proceeds to ACT 9. As ACT 9, the processor 41 generates a matrix of the evaluation values Aij. For example, as shown in FIG. 8, a matrix 50 having the first to fourth midpoints 371, 372, 373, and 374 as rows, the first to fourth corners 361, 362, 363, and 364 as columns, and the related evaluation values Aij as components of the matrix is generated.

When the generation of the matrix 50 is ended, the processor 41 proceeds to ACT 10. As ACT 10, the processor 41 executes an object recognition process.

FIG. 5 is a flowchart of this object recognition process. As ACT 21, when the object recognition process is started, the processor 41 sets a first counter r to an initial value "1". As ACT 22, the processor 41 sets a second counter n to the initial value "1". Each of the first counter r and the second counter n is a type of a forward counter variable managed in the RAM 44 or the like.

As ACT 23, the processor 41 searches the evaluation values Aij in the matrix 50 and selects the evaluation value Aij having a maximum value. Then, as ACT 24, the processor 41 stores in the RAM 44 information about the corner and the midpoint that is a combination corresponding to the selected evaluation value Aij. For example, assuming that an evaluation value A11 of the first column in the first row of the matrix 50 is the maximum value, the processor 41 stores information related to a combination of the evaluation values A11, that is, the coordinates (Xe, Ye) serving as the key point of the first midpoint 371 and the coordinates (Xa, Ya) serving as the key point of the first corner 361.

Next, as ACT 25, the processor 41 excludes the maximum evaluation value Aij from a recognition processing target. As ACT 26, the processor 41 excludes a row i and a column j of the maximum evaluation value Aij from search candidates. Then, as ACT 27, the processor 41 increments the second counter n upward by "1". As ACT 28, the processor 41 checks whether the second counter n exceeds an upper limit value N. The upper limit value N is the smallest of the number of rows and the number of columns of the matrix 50. In the present embodiment, since the number of rows of the matrix and the number of columns of the matrix are both "4", the upper limit value N is "4".

When the second counter n does not exceed the upper limit value N, the processor 41 returns from ACT 28 to ACT 23. The processor 41 executes the processing of ACT 23 and thereafter in the same manner as described above. Accordingly, the processor 41 selects the evaluation value Aij having the maximum value from the evaluation values Aij excluding the row i and the column j which are excluded from the search candidates. Then, the processor 41 stores in the RAM 44 information on the corner and the midpoint that is a combination of the selected evaluation value Aij. For example, assuming that an evaluation value A22 of the second column in the second row of the matrix 50 is the maximum value, the processor 41 stores information related to a combination of the evaluation values A22, that is, the coordinates (Xf, Yf) serving as the key point of the second midpoint 372 and the coordinates (Xb, Yb) serving as the key point of the second corner 362.

Thereafter, the processor 41 excludes the evaluation value Aij selected in the processing of ACT 23 from the recognition processing target, and excludes the row i and the column j of the evaluation value Aij from the search candidates. Then, the processor 41 counts up (increments upward) the second counter n.

When the upper limit value N is "4", the second counter n does not exceed the upper limit value N at this time. Therefore, the processor 41 returns from ACT 28 to ACT 23. The processor 41 executes the processing of ACT 23 and thereafter in the same manner as described above. That is, the processor 41 selects the evaluation value Aij having the maximum value from the evaluation values Aij excluding the row i and the column j which were already excluded from the search candidates. Then, the processor 41 stores in the RAM 44 information about the corner and the midpoint that is a combination corresponding to the selected evaluation value Aij. For example, assuming that an evaluation value A33 of the third column in the third row of the matrix 50 is the maximum value, the processor 41 stores information related to a combination of the evaluation values A33, that is, the coordinates (Xg, Yg) serving as the key point of the third midpoint 373 and the coordinates (Xc, Yc) serving as the key point of the third corner 363.

Thereafter, the processor 41 excludes this evaluation value Aij selected in the processing of ACT 23 from the recognition processing target, and excludes the row i and the column j of this evaluation value Aij from the search candidates. Then, the processor 41 counts up (increments upward) the second counter n.

When the upper limit value N is "4", the second counter n does not exceed the upper limit value N even at this time. Therefore, the processor 41 returns from ACT 28 to ACT 23.

The processor 41 executes the processing of ACT 23 and thereafter in the same manner as described above. That is, the processor 41 selects the evaluation value Aij having the maximum value from the evaluation values Aij excluding the row i and the column j which were already excluded from the search candidates. Then, the processor 41 stores in the RAM 44 information about the corner and the midpoint that is a combination corresponding to the selected evaluation value Aij. For example, assuming that an evaluation value A44 of the fourth column in the fourth row of the matrix 50 is the maximum value, the processor 41 stores information related to a combination of the evaluation values A44, that is, the coordinates (Xh, Yh) serving as the key point of the fourth midpoint 374 and the coordinates (Xd, Yd) serving as the key point of the fourth corner 364.

Thereafter, the processor 41 excludes this latest evaluation value Aij selected in the processing of ACT 23 from the recognition processing target, and excludes the row i and the column j of this evaluation value Aij from the remaining search candidates. Then, the processor 41 counts up (increments upward) the second counter n.

When the upper limit value N is "4", the second counter n now exceeds the upper limit value N. The processor 41 proceeds from ACT 28 to ACT 29. As ACT 29, the processor 41 resets all rows i and columns j of the matrix 50 as search candidates. Then, as ACT 30, the processor 41 counts up (increments upward) the first counter r by "1". As ACT 31, the processor 41 confirms whether the first counter r exceeds an upper limit value R. The upper limit value R may be an integer of "2" or more. In the present embodiment, the upper limit value R is set to "2".

When the first counter r does not exceed the upper limit value R, the processor 41 returns from ACT 31 to ACT 22. As ACT 22, the processor 41 sets the second counter n to the initial value "1". Thereafter, the processor 41 repeatedly executes the processing from ACT 23 to ACT 27 until the second counter n exceeds the upper limit value N. However, in ACT 23, the maximum value is selected from the evaluation values Aij other than the maximum evaluation value Aij already excluded in the previous processing of ACT 25.

For example, assuming that an evaluation value A14 is the maximum value, the processor 41 stores information related to a combination of the evaluation values A14, that is, the coordinates (Xe, Ye) serving as the key point of the first midpoint 371 and the coordinates (Xd, Yd) serving as the key point of the fourth corner 364.

Thereafter, for example, assuming that an evaluation value A21 is the maximum value, the processor 41 stores information related to a combination of the evaluation values A21, that is, the coordinates (Xf, Yf) serving as the key point of the second midpoint 372 and the coordinates (Xa, Ya) serving as the key point of the first corner 361.

Thereafter, assuming that an evaluation value A32 is the maximum value, the processor 41 stores information related to a combination of the evaluation values A32, that is, the coordinates (Xg, Yg) serving as the key point of the third midpoint 373 and the coordinates (Xb, Yb) serving as the key point of the second corner 362.

Thereafter, assuming that an evaluation value A43 is the maximum value, the processor 41 stores information related to a combination of the evaluation values A43, that is, the coordinates (Xh, Yh) serving as the key point of the fourth midpoint 374 and the coordinates (Xc, Yc) serving as the key point of the third corner 363.

Thus, when the second counter n exceeds the upper limit value N, the processor 41 executes the processing of ACT 29 to ACT 31. In ACT 31, when the first counter r exceeds the upper limit value R, the processor 41 proceeds to ACT 32. As ACT 32, the processor 41 connects the coordinates serving as the key points based on the information stored in the processing of ACT 24. That is, in the present embodiment, the following first to eighth information is stored in the processing of ACT 24.

| | |
|---|---|
| First information | coordinates (Xe, Ye) and coordinates (Xa, Ya) |
| Second information | coordinates (Xe, Ye) and coordinates (Xd, Yd) |
| Third information | coordinates (Xf, Yf) and coordinates (Xb, Yb) |
| Fourth information | coordinates (Xf, Yf) and coordinates (Xa, Ya) |
| Fifth information | coordinates (Xg, Yg) and coordinates (Xc, Yc) |
| Sixth information | coordinates (Xg, Yg) and coordinates (Xb, Yb) |
| Seventh information | coordinates (Xh, Yh) and coordinates (Xd, Yd) |
| Eighth information | coordinates (Xh, Yh) and coordinates (Xc, Yc) |

Figure 9:
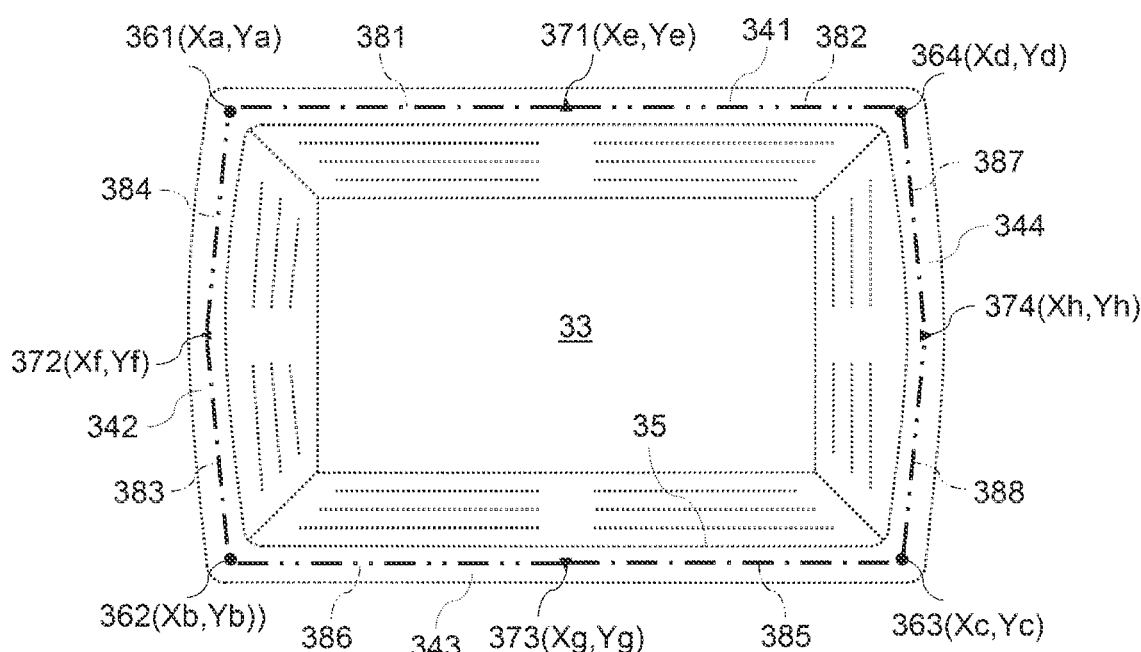
FIG. 9 is a schematic diagram showing a recognition result of a shopping basket obtained by an object recognition process.

Accordingly, the processor 41 connects the coordinates (Xe, Ye) serving as the key point of the first midpoint 371 and the coordinates (Xa, Ya) serving as the key point of the first corner 361 as indicated by a line segment 381 in FIG. 9. Further, the processor 41 connects the coordinates (Xe, Ye) serving as the key point of the first midpoint 371 and the coordinates (Xd, Yd) serving as the key point of the fourth corner 364 as indicated by a line segment 382 in FIG. 9.

Similarly, the processor 41 connects the coordinates (Xf, Yf) serving as the key point of the second midpoint 372 and the coordinates (Xb, Yb) serving as the key point of the second corner 362 as indicated by a line segment 383 in FIG. 9. Further, the processor 41 connects the coordinates (Xf, Yf) serving as the key point of the second midpoint 372 and the coordinates (Xa, Ya) serving as the key point of the first corner 361 as indicated by a line segment 384 in FIG. 9.

The processor 41 connects the coordinates (Xg, Yg) serving as the key point of the third midpoint 373 and the coordinates (Xc, Yc) serving as the key point of the third corner 363 as indicated by a line segment 385 in FIG. 9. Further, the processor 41 connects the coordinates (Xg, Yg) serving as the key point of the third midpoint 373 and the coordinates (Xb, Yb) serving as the key point of the second corner 362 as indicated by a line segment 386 in FIG. 9.

The processor 41 connects the coordinates (Xh, Yh) serving as the key point of the fourth midpoint 374 and the coordinates (Xd, Yd) serving as the key point of the fourth corner 364 as indicated by a line segment 387 in FIG. 9. Further, the processor 41 connects the coordinates (Xh, Yh) serving as the key point of the fourth midpoint 374 and the coordinates (Xc, Yc) serving as the key point of the third corner 363 as indicated by a line segment 388 in FIG. 9. Thus, as shown in FIG. 9, a region of the opening portion 35 is identified by the eight line segments 381, 382, 383, 384, 385, 386, 387, and 388.

When the connection of the coordinates serving as the key points is ended, the processor 41 proceeds to ACT 33. As ACT 33, the processor 41 determines whether the object can be identified. The shopping basket 30, which is the object to be recognized, can be identified by recognizing the opening portion 35 thereof from the camera image. As described above, when the region of the opening portion 35 is identified, the processor 41 determines that the object can be identified. When the region of the opening portion 35 cannot be identified, the processor 41 determines that the object cannot be identified.

When the object is identified, the processor 41 proceeds from ACT 33 to ACT 34. As ACT 34, the processor 41 stores information indicating recognition success. For example, the processor 41 sets a determination flag of 1-bit data stored in the RAM 44 to "1". In contrast, when the object cannot be identified, the processor 41 proceeds from ACT 33 to ACT 35. As ACT 35, the processor 41 stores information indicating recognition failure. For example, the processor 41 sets the determination flag to "0".

When the processing of ACT 34 or ACT 35 is ended, the processor 41 exits the object recognition process. The description returns to FIG. 4.

After exiting the object recognition process, the processor 41 proceeds to ACT 11. As ACT 11, the processor 41 checks whether the recognition of the object was successful. When the determination flag is "1", the processor 41 determines that the recognition of the object was successful. When the determination flag is "0", the processor 41 determines that the recognition of the object failed.

When the recognition of the object is successful, the processor 41 proceeds from ACT 11 to ACT 12. As ACT 12, the processor 41 outputs the recognition result. That is, the processor 41 notifies the monitoring apparatus that the shopping basket 30 has been placed on the basket receiving table 102. Alternatively, the processor 41 displays, on the display device 52, that the shopping basket 30 has been placed on the basket receiving table 102.

On the other hand, when the recognition of the object failed, the processor 41 proceeds from ACT 11 to ACT 13. That is, when the four corners 361, 362, 363, and 364 constituting the opening portion 35 of the shopping basket 30 placed on the basket receiving table 102 can be detected from the camera image but the region of the opening portion 35 cannot be identified, the processor 41 proceeds to ACT 13. As ACT 13, the processor 41 checks whether a next camera image has been taken in. When the next camera image has been taken in, the processor 41 returns from ACT 13 to ACT 1. The processor 41 executes the processing of ACT 1 and thereafter in the same manner as described above.

In ACT 13, when the next camera image is not yet taken in, the processor 41 proceeds from ACT 13 to ACT 14. As ACT 14, the processor 41 outputs a recognition failure. That is, the processor 41 notifies the monitoring apparatus that the recognition of the shopping basket 30 failed. Alternatively, the processor 41 displays, on the display device 52, that the recognition of the shopping basket 30 failed.

In this context, the processor 41 implements the functions as the acquisition unit 411 through the processing of ACT 1 to ACT 3 in FIG. 4. The processor 41 implements the functions as the identification unit 412 through the processing of ACT 4 to ACT 6 in FIG. 4. The processor 41 implements the functions as the calculation unit 413 through the processing of ACT 7 and ACT 8 in FIG. 4. The processor 41 implements the functions as the selection unit 414 through the processing of ACT 9 in FIG. 4 and ACT 21 to ACT 29 in FIG. 5. The processor 41 implements the functions as the recognition unit 415 through the processing of ACT 30 to ACT 33 in FIG. 5. The processor 41 implements the functions as the output unit 416 through the processing of ACT 12 to ACT 14 in FIG. 4.

According to the present embodiment, it is possible to provide an image processing apparatus 40 capable of assigning a plurality of connection relationships from one key point to another key point having relevance. Such an image processing apparatus 40 can detect the opening portion 35 of the shopping basket 30 placed on the basket receiving table 102 of a self-service POS terminal 10.

Although one particular embodiment is described above, the present disclosure is not limited thereto.

In an embodiment, the shopping basket 30 placed on the basket receiving table 102 is recognized by detecting the substantially rectangular opening portion 35, but the object to be recognized is not limited thereto. It is also possible to use another container of a different type having an opening in a different shape as the object to be recognized. In general, the image processing apparatus can be applied to recognition of a recognizable object by assigning two or more connection relationships from one key point to another key point.

In an embodiment, in ACT 9, the matrix 50 having the first to fourth midpoints 371, 372, 373, and 374 as the rows, the first to fourth corners 361, 362, 363, and 364 as the columns, and the related evaluation values Aij as the components of the matrix is generated. In this regard, a matrix having the first to fourth corners 361, 362, 363, and 364 as the rows and the first to fourth midpoints 371, 372, 373, and 374 as the columns may be generated.

While certain embodiments have been described, these embodiments have been presented by way of example only, and are not intended to limit the scope of the disclosure. Such embodiments can be implemented in other various forms, and various omissions, replacements, and changes can be made without departing from the spirit of the present disclosure. These other embodiments and the modifications thereof are included in the scope of the present disclosure and reflected in the claims and equivalents thereof.

What is claimed is:

1. A point-of-sale system, comprising:
a self-service point-of-sale terminal with a basket placing table and a registered commodity placing table;
a camera positioned to obtain images of a user of the self-service point-of-sale terminal and the basket placing table;
an image processing apparatus including:
a camera interface connected to the camera;
a communication interface for connecting to an external device; and
a processing unit configured to:
acquire an image from the camera via the camera interface;
identify at least two different types of key points of an object depicted in the image;
calculate evaluation values of respective combinations in which the different types of key points are connected to one another;
select at least two patterns of combinations with other key points in descending order of the evaluation values for each of the key points; and
recognize the object depicted in the image by connecting combinations of at least two patterns selected for each of the key points with other key points.

2. The point-of-sale system according to claim 1, wherein the processing unit is further configured to:
output a recognition result indicating whether the object depicted in the image has been recognized by the processing unit.

3. The point-of-sale system according to claim 2, wherein the recognition result is output to the external device via the communication interface.

4. The point-of-sale system according to claim 3, wherein the external device is a display screen.

5. The point-of-sale system according to claim 1, wherein the object is a shopping basket on the basket placing table.

6. The point-of-sale system according to claim 5, wherein the shopping basket has a generally rectangular opening, the corners of the rectangular opening are one type of key point, and the midpoints of the sides of the rectangular opening are another type of key point.

7. The point-of-sale system according to claim 1, wherein the processing unit includes a central processing unit and a graphics processing unit.

8. The point-of-sale system according to claim 1, wherein the evaluation values are calculated based on vector information and a path length between the connected key points.

9. The point-of-sale system according to claim 1, wherein the object has a rectangular opening, the corners of the rectangular opening are one type of key point, and the midpoints of the sides of the rectangular opening are another type of key point.

10. The point-of-sale system according to claim 9, wherein the object is recognized by the identification of the rectangular opening in the image.

11. The image processing method according to claim 10, wherein the object is a shopping basket.

12. An image processing method for a self-service point-of-sale system, the method comprising:

acquiring an image depicting an object on a basket placing table of a self-service point-of-sale terminal from a camera positioned to obtain images of a user of the self-service point-of-sale terminal and the basket placing table;

identifying at least two different types of key points of the object in the image;

calculating evaluation values of respective combinations in which different types of key points are connected to one another;

selecting at least two patterns of combinations with other key points in descending order of the evaluation values for each of the key points; and recognizing the object depicted in the image as a shopping basket by connecting combinations of two or more patterns selected for each of the key points with other key points.

13. The image processing method according to claim 12, further comprising:

outputting a recognition result indicating whether the object depicted in the image has been recognized as the shopping basket or not.

14. The image processing method according to claim 12, wherein the shopping basket has a generally rectangular opening, the corners of the rectangular opening are one type of key point, and the midpoints of the sides of the rectangular opening are another type of key point.

* * * * *